Nov. 13, 1934.   O. JOHNSON   1,980,531
ABSORPTION REFRIGERATING SYSTEM
Filed March 2, 1931   2 Sheets-Sheet 1
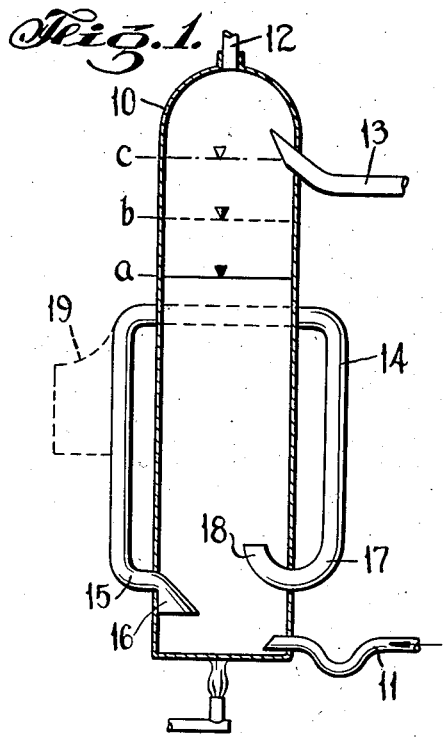
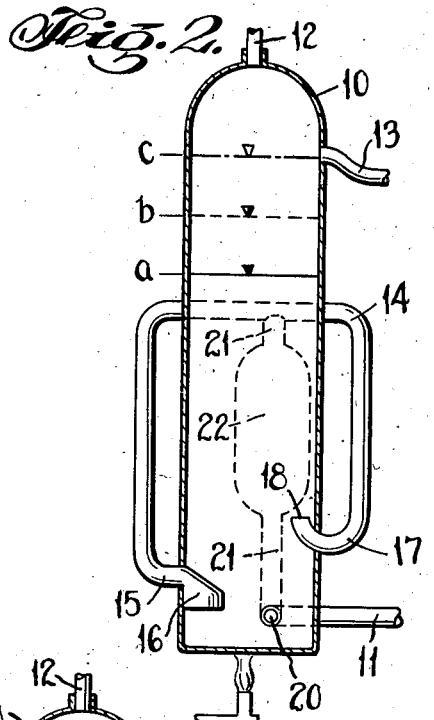
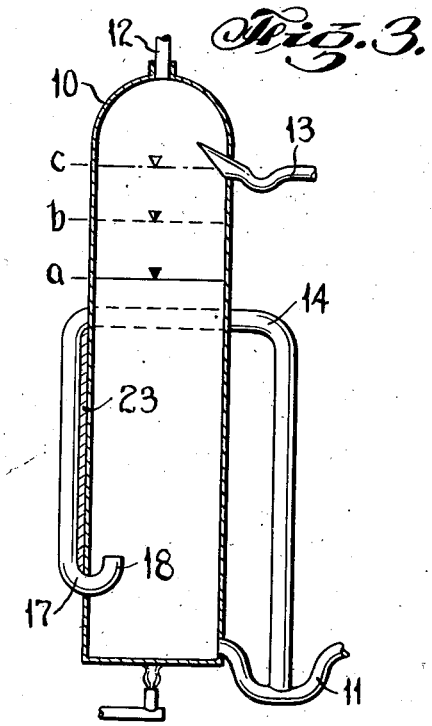
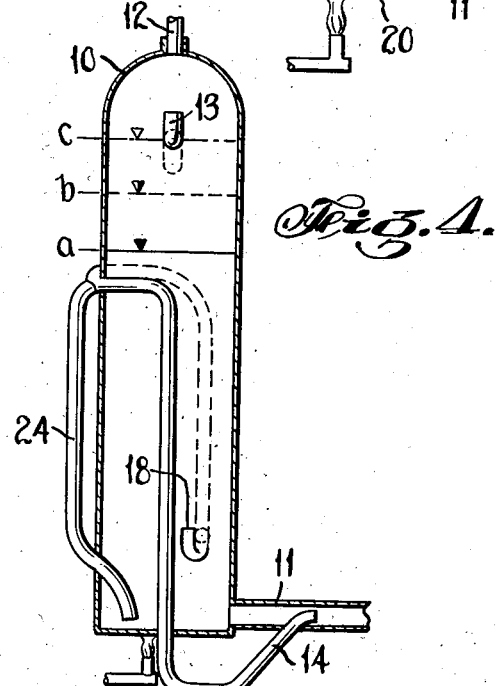
INVENTOR
Oscar Johnson
BY
ATTORNEY Nov. 13, 1934.  O. JOHNSON  1,980,531
ABSORPTION REFRIGERATING SYSTEM
Filed March 2, 1931  2 Sheets-Sheet 2
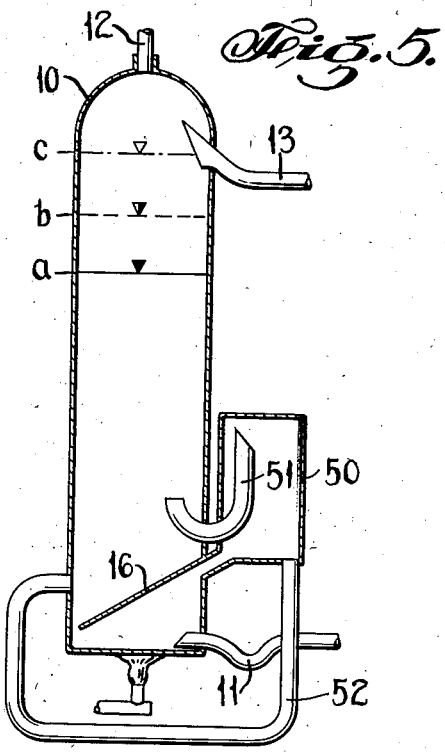
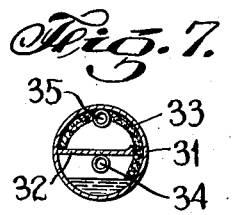
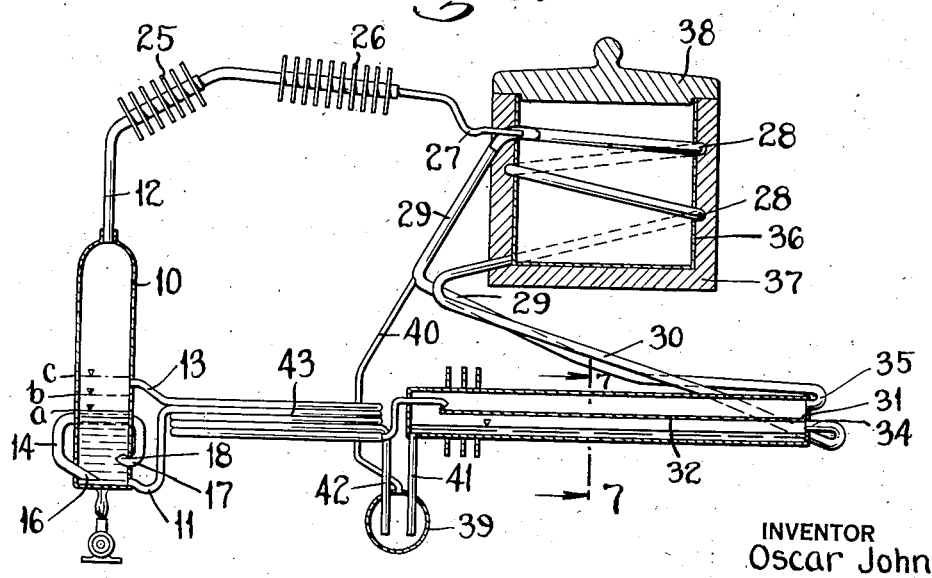
INVENTOR
Oscar Johnson
BY
ATTORNEY Patented Nov. 13, 1934

1,980,531

UNITED STATES PATENT OFFICE 1,980,531

ABSORPTION REFRIGERATING SYSTEM

Oscar Johnson, Stockholm, Sweden, assignor, by mesne assignments, to Electrolux Servel Corporation, New York, N. Y., a corporation of Delaware Application March 2, 1931, Serial No. 519,330
In Germany May 12, 1930

15 Claims. (Cl. 62—119.5)

This invention relates to a method of and means for increasing the flow of liquids circulated by the application of heat in closed systems, and more particularly absorption refrigerating systems wherein one portion of the circulating absorption liquid is made lighter by the heat supplied to the boiler so that such light absorption liquid rises to a higher level than the level in the absorber so that it will flow by gravity to the latter.

It is an object of the invention to improve a system of this character by increasing the lifting height of the apparatus. This object is accomplished by returning gas driven off from the boiler to the boiler below its liquid level. In general, small bubbles of vapor expelled by heating the absorption solution are collected and accumulated to form a relatively large volume of vapor which is injected into the circulating absorption solution in a rising portion of its path of flow thereby accentuating the lifting effect of the vapor.

Further objects and advantages will be apparent and a fuller understanding of the nature of the invention may be had from the following description taken in connection with the accompanying drawings wherein Figs. 1 to 5 are diagrammatic views illustrating several embodiments of the invention applied to boilers suitable primarily for absorption refrigerating units of small size;

Fig. 6, a diagrammatic view of a boiler embodying this invention and connected in a refrigerating system operating with a pressure equalizing gas; and Fig. 7, a section through the absorber on the line 7—7 of Fig. 6.

As shown in Fig. 1, a boiler 10, preferably cylindrical, is adapted to be connected in an absorption refrigerating system, and may be heated by any desired means as, for example, a gas burner. A pipe 11 with the usual U-bend or trap is connected to the lower portion of the boiler and is adapted to convey strong solution from the absorber to the boiler by way of a heat exchanger.

To the top of the boiler is connected a pipe 12 through which gas liberated from the solution in the boiler by heat is conducted to the condenser of a refrigerating system. A pipe 13 extends from the boiler to the absorber and serves to conduct weak absorption liquid to the absorber from the boiler. The end of the pipe 13 which extends into the boiler as shown in Figs. 1, 3, 4 and 5 is enlarged in order to catch the solution more easily as hereinafter set forth.

In accordance with the present invention, a substantially U-shaped chamber formed by a pipe 14 has one leg extending into the lower portion of the boiler and provided with an end 16 which forms a funnel spaced near the lower end of the boiler and its opposite leg 17 entering the boiler above the entrance 15 having its end terminating in an upturned portion 18 to serve as a siphon. The volume of the pipe 14 may be increased in a number of ways as for example by the addition of a container 19 shown in Fig. 1 connected to said pipe and having its upper and lower ends connected to the pipe 14, such container being omitted if desired.

In operation, assuming that the level in the boiler is at $a$, when the boiler is heated the liquid therein becomes lighter and the liquid level increases to $b$. The pipe 14 is also filled with absorption solution and part of the gases liberated by the heating action are in accordance with the invention caught by the funnel 16 and collected in this pipe, which is below the liquid level within the boiler. When the gas collecting in pipe 14 has reached the lowest point 17 of the U-tube, it is ejected by spurts through the siphon bend 18. The extremities of the U-tube are connected to the boiler in such a manner that gas collected in the pipe 14 and container 19 is pushed out at the same time that liquid enters the funnel 16. Gas discharged from the pipe 14 below the liquid level in the boiler raises the liquid level from $b$ to $c$ where the solution overflows into the enlarged end of the pipe 13 and is carried by gravity to the absorber. The gas discharged through the U-tube siphon 18 is replaced by liquid which flows into the pipe through the funnel and the process repeated.

While the pipe 14 is shown as having one leg terminating in a bend 18, this is unnecessary and the pipe may terminate where it joins the boiler, the important feature being the valve action by means of which the gas collected below the liquid level in the boiler is caused to re-enter the boiler below the liquid level by spurts or as larger accumulated gas bubbles. The invention is not limited to this specific arrangement of valve mechanism and the provision of a U-tube 14 as shown to accomplish this purpose is merely by way of illustration.

In Fig. 2 another embodiment or modified form of the invention is illustrated. In this arrangement the pipe 11 is not only connected to the boiler at 20, but also is provided with a connection to the upper intermediate portion of the U-tube 14, by means of a pipe 21 provided with a container 22 of larger diameter which serves to increase the volume. Whether or not the container 19 of Fig. 1 or the container 22 of Fig. 2 are used is dependent primarily on the cross-sectional area of the pipe 14. The pipe 13 for carrying the weak solution to the absorber terminates in the upper part of the boiler and has a short downward slant to a point without the boiler slightly spaced therefrom.

The operation of the arrangement shown in Fig. 2 corresponds to that of Fig. 1. However, in this embodiment the liquid that enters the U-pipe 14 and receptacle 22 is replaced not only from the boiler but also from the absorber by liquid coming through pipe 11.

In Fig. 3 another embodiment is illustrated. Instead of one leg of the pipe 14 having its lower end entering the boiler, it is connected to the pipe 11 which conducts strong solution from the lower portion of the absorber to the lower portion of the boiler and the other leg of the pipe 14 which terminates within the boiler in the siphon 18 is disposed in heat exchange relation with the boiler for a substantial portion of its length at 23.

By the above arrangement no gas is taken from the boiler by means of a funnel as in Figs. 1 and 2, but heat transmitted by the wall 23 of the boiler to the leg of the pipe 14 generates the gas necessary for the circulation of the liquid contained in the pipe 14.

Fig. 4 illustrates a further embodiment of the invention wherein the pipe 14 is branched off from the strong liquor line 11 coming from the absorber and the intermediate or horizontal upper portion of the U-tube is provided with a depending connecting pipe 24 which extends into the boiler at its lower end and terminates within the boiler near the bottom of the same.

With this construction gas taken up below the boiler level is collected by the lower portion of the depending pipe 24 which projects inside the boiler, otherwise the operation is similar to that previously described.

In Fig. 5 a slightly different embodiment is illustrated. The funnel 16 is formed by an inclined partition plate, which funnel communicates with a chamber, herein referred to as a pressure dome 50, and a siphon 51 connects this pressure dome with the interior of the boiler above the funnel. The bottom of the pressure dome is connected by means of a pressure pipe 52 with the lower portion of the boiler. The arrangement of the parts is such that substantially all of the gas generated by the heat is caused to enter the pressure dome and by selecting pipes of appropriate cross-section and connecting the pipes at the proper points, a sudden release into the boiler of all gas collected in the pressure dome 50 through the siphon 51 is accomplished. The liquid level in the boiler is therefore raised an appreciable amount. Gas suddenly released from the dome 50 is replaced by liquid flowing from the pipe 52 and the process is repeated. The gas volume suddenly released into the boiler raises the level as the gas pushed out displaces the liquid volume in the boiler. This displacement does not appreciably affect the absorber as the resistance against liquid flow in the heat exchanger as well as in the lower part of the boiler partly due to its narrowness and partly due to the upward tendency caused by the heating is much greater than in the upper portion of the boiler.

In Fig. 6, is illustrated an absorption refrigerating apparatus of small size suitable for household use and having a small evaporator or cooling chamber. For purpose of illustration the apparatus may be considered to operate with water as an absorbing medium, ammonia as a refrigerant, and hydrogen as an auxiliary or pressure equalizing gas. In this figure as in those previously described, the boiler 10 is heated for example by a gas burner and the gas liberated flows through pipe 12 and rectifier 25 to condenser 26. The condensed liquid flows through pipe 27 into the evaporator coil 28 at the point where the auxiliary gas is supplied from the absorber through a pipe 29 in the usual manner. The liquid refrigerant evaporates into this pressure equalizing gas and the gas mixture thus formed, flows down through the evaporator and through a heat exchanger 30 to the absorber 31. The absorber 31 may be of horizontal construction and provided with cooling flanges or fins only a few of which are shown.

The absorber is preferably of cylindrical construction as shown in Fig. 7, and is provided with one or more plates 32 from one edge of which a wire gauze extends upwardly around the absorber covering about three quarters of its inner circumference. This wire gauze serves as a capillary siphon for absorption solution flowing onto the plate, such absorption solution being siphoned from one edge of the plate up and over and down past the opposite edge to the lower part of the absorber. By providing the plate 32 of sufficient length and width, the absorber may be subdivided so that the heavier gas coming from the evaporator and entering the lower portion of the absorber through the pipe 34 flows through the entire length of the lower portion of the absorber and then returns above the plate 32 during which flow the refrigerant is absorbed from the auxiliary gas and the purified auxiliary gas passes out through the pipe 35 and the heat exchanger 30 and to the evaporator through pipe 29. The pipes forming the evaporator and leading to the absorber therefrom are appropriately inclined from the point where the liquid ammonia enters the absorber coil to the point where the heavier gas mixture enters absorber and similarly the return line for the auxiliary gas from the absorber to the evaporator is also inclined, these pipes being brought together to form the heat exchanger 30.

The evaporator coil 28 surrounds and is in good thermal contact with a receptacle 36 which forms a cooling chamber. The receptacle 36 is covered by insulation 37 and is provided with a cover 38 of insulating material. In apparatus where the boiler and the absorber are of comparatively small size, a receiver or storage container 39 may be provided for the absorption liquid and in such case the pipe 40 is provided which vents the upper part of the container to the pipe 29. The receptacle 39 is connected with the absorber by means of a pipe 41. A pipe 42 connects the storage container 39 with the liquid heat exchanger 43 from whence strong liquor flows through pipe 11 into the lower part of the boiler. By the heating of the boiler and the previously described operation of the gas collecting device the liquid level rises to c from where the weak solution flows through the pipe 13 and the heat exchanger 43 to the plate 32 of the absorber, and is siphoned by the wire gauze 33 to the lower part of the absorber, thus completing the cycle of operation.

In the described embodiment the absorber requires a very small lifting height, while the lifting height attained by the new pump arrangement in the boiler is sufficiently great that resistance offered by the heat exchanger is easily overcome by the liquid flowing to the absorber from the boiler.

The invention is not restricted to a horizontal absorber, but may be applied to vertical absorbers of greater lifting heights. It is also not restricted to absorption refrigerating units but may be employed wherever liquids are circulated in closed systems by means of the application of heat.

It will be obvious to those skilled in the art that various other changes may be made in the construction and arrangement without departing from the spirit of the invention and therefore the invention is not limited to what is shown in the drawings and described in the specification but only as indicated in the appended claims.

I claim:

1. In combination with the generator of an absorption type refrigerating apparatus, a U-tube wholly below the generator liquid level having its legs extending downwardly and communicating with the generator at different levels below the surface of the liquid.

2. In combination with the generator of an absorption type refrigerating appaartus, a U-tube having its legs extending downwardly, one leg terminating with a downwardly flared opening near the bottom of the generator, and the other leg terminating with an upturned opening below the liquid level in the generator.

3. In combination with the generator of an absorption type refrigerating apparatus, a strong liquid return line, a U-tube having its legs extending downwardly, one leg connected to the strong liquor return line, and the other leg in thermal exchange relation with the generator and terminating with an upturned opening below the liquid level in the generator.

4. In combination with the generator of an absorption type refrigerating apparatus, a U-tube having its legs extending downwardly, one leg terminating within the generator near the bottom thereof, and the other leg terminating with an upturned opening below the liquid level in the generator, a strong liquor return line, and a conduit between said line and the U-tube.

5. In combination with the generator of an absorption type refrigerating apparatus, a strong liquor return line, a U-tube having downwardly extending legs, one leg connected to said line and the other leg connected to the generator below the liquid level therein, and a pipe connected to said U-tube and terminating with a downward opening below the liquid level within the generator.

6. In combination with a boiler, a fluid tight vessel, a U-tube with one leg extending upwardly within said vessel and the other leg extending upwardly in the boiler below the liquid level therein, a partition forming an upwardly tapering chamber open at the bottom below the liquid level in the boiler, a conduit between the top of said chamber and the fluid tight vessel, and a conduit between said vessel and the boiler below the liquid level therein.

7. In a refrigerating system of the absorption type, a generator, an absorber, a conduit having its opening in the absorber at a lower level than its opening in the generator, a second conduit having its opening in the generator at a lower level than its opening in the absorber and a U-tube having downwardly extending legs each connected to the generator below the liquid level therein.

8. In a refrigerating system of the absorption type, a generator, an absorber, fluid connections between said generator and absorber, and a U-tube having downwardly extending legs, one leg terminating with a downward opening near the bottom of the generator and its other leg terminating with an upward opening below the liquid level within the generator.

9. In an absorption refrigerating system of the pressure equalized type including a generator and an absorber interconnected for the circulation of absorption liquid therethrough by the upward movement of liquid in the generator, means for increasing liquid circulation comprising a chamber below the level of and communicating with the absorption liquid circuit, means for collecting below the liquid level vapor expelled from solution in the generator and conducting the vapor into said chamber, and means for intermittently discharging vapor accumulated in said chamber into the liquid in the generator.

10. In an absorption refrigerating system of the pressure equalized type including a generator and an absorber interconnected for the circulation of absorption liquid therethrough by the upward movement of liquid in the generator, means for increasing liquid circulation comprising a chamber below the level of and communicating with the absorption liquid circuit, means for collecting below the liquid level vapor expelled from solution in the generator and conducting the vapor into said chamber, and a siphon discharge conduit from said chamber into the generator below the liquid level.

11. In an absorption refrigerating system of the pressure equalized type including a generator and an absorber interconnected for the circulation of absorption liquid therethrough by the upward movement of liquid in the generator, means for increasing the liquid circulation comprising a chamber connected to be filled with absorption liquid due to a liquid head in the system, means for directing vapor expelled from solution in the lower part of the generator into said chamber, and means responsive to the pressure in said chamber for discharging vapor from said chamber into the liquid in the generator.

12. In an absorption refrigerating system of the pressure equalized type including a generator and an absorber interconnected for the circulation of absorption liquid therethrough by the upward movement of liquid in the generator, means for increasing the liquid circulation comprising a chamber connected to be filled with absorption liquid due to a liquid head in the system, means for directing vapor expelled from solution in the lower part of the generator into said chamber, and a siphon discharge for vapor accumulated in said chamber into the liquid in the generator.

13. The method of raising the level of a column of liquid which comprises heating the liquid to form vapor which rises through the column in the form of bubbles, collecting below the liquid level bubbles of the vapor to accumulate a relatively large volume of vapor, and injecting the larger volume of vapor into said column.

14. The method of increasing circulation of absorption liquid in an absorption refrigeration system of the pressure equalized type which comprises heating the liquid in a rising path of flow whereby vapor is expelled and rises through the liquid in the form of bubbles, collecting below the liquid level bubbles of the expelled vapor to accumulate a relatively large volume of vapor, and injecting the larger volume of vapor into the rising liquid.

15. In an absorption refrigeration system of the pressure equalized type including a generator in the rising path of flow of absorption liquid, means for collecting vapor bubbles below the liquid level in said generator, means for accumulating the collected bubbles to form a relatively large volume of vapor, and means for injecting the larger volume of vapor into the liquid in said generator.

OSCAR JOHNSON.